(12) United States Patent
Anand et al.

(10) Patent No.: US 8,315,977 B2
(45) Date of Patent: Nov. 20, 2012

(54) DATA SYNCHRONIZATION BETWEEN A DATA CENTER ENVIRONMENT AND A CLOUD COMPUTING ENVIRONMENT

(75) Inventors: Siddharth Anand, Santa Clara, CA (US); Naresh Gopalani, Sunnyvale, CA (US); Greg Kim, Los Altos, CA (US); Neil Hunt, Los Altos, CA (US); Santosh R. Rau, Palo Alto, CA (US)

(73) Assignee: Netflix, Inc., Los Gatos, CA (US)

( * ) Notice: Subject to any disclaimer, the term of this patent is extended or adjusted under 35 U.S.C. 154(b) by 245 days.

(21) Appl. No.: 12/710,231

(22) Filed: Feb. 22, 2010

(65) Prior Publication Data
US 2011/0208695 A1     Aug. 25, 2011

(51) Int. Cl.
*G06F 17/30* (2006.01)
(52) U.S. Cl. ...................................................... 707/610
(58) Field of Classification Search ............... 707/610, 707/756; 709/224, 230, 248
See application file for complete search history.

(56) References Cited

U.S. PATENT DOCUMENTS

| | | | |
|---|---|---|---|
| 2005/0240621 A1 | 10/2005 | Robertson et al. | |
| 2006/0230076 A1 | 10/2006 | Gounares et al. | |
| 2007/0233756 A1 | 10/2007 | D'Souza et al. | |
| 2009/0157419 A1* | 6/2009 | Bursey | 705/1 |
| 2010/0011368 A1 | 1/2010 | Arakawa et al. | |
| 2010/0205541 A1* | 8/2010 | Rapaport et al. | 715/753 |
| 2010/0235431 A1 | 9/2010 | Poluri et al. | |
| 2010/0318609 A1 | 12/2010 | Lahiri et al. | |
| 2011/0022812 A1* | 1/2011 | van der Linden et al. | 711/163 |
| 2011/0093435 A1* | 4/2011 | Zha et al. | 707/639 |
| 2011/0093436 A1* | 4/2011 | Zha et al. | 707/639 |
| 2011/0302327 A1* | 12/2011 | Prophete et al. | 709/248 |
| 2012/0042061 A1* | 2/2012 | Ayala et al. | 709/224 |
| 2012/0079095 A1* | 3/2012 | Evans et al. | 709/224 |
| 2012/0079126 A1* | 3/2012 | Evans et al. | 709/230 |
| 2012/0131461 A1* | 5/2012 | Raymond et al. | 715/723 |

OTHER PUBLICATIONS

Patent Cooperation Treaty International Search Report, Ser. No. PCT/US 11/25617, dated Apr. 27, 2011.
Patent Cooperation Treaty Written Opinion of the International Searching Authority, Ser. No. PCT/US 11/25617, dated Apr. 27, 2011.

* cited by examiner

*Primary Examiner* — Jean M Corrielus
(74) *Attorney, Agent, or Firm* — Patterson & Sheridan, LLP

(57) ABSTRACT

Methods, systems, and articles for simultaneously maintaining copies of data in a data center and a cloud computing environment providing network based services. Synchronizing applications monitor modifications to data records made in the data center and the cloud computing environment. The synchronizing applications are also configured to convert modified records from the data center into a format compatible with databases in the cloud computing environment prior to updating the databases in the cloud computing environment, and vice versa.

18 Claims, 5 Drawing Sheets

DATA SYNCHRONIZATION BETWEEN A DATA CENTER ENVIRONMENT AND A CLOUD COMPUTING ENVIRONMENT

BACKGROUND OF THE INVENTION

1. Field of the Invention

The present invention relates to providing network based services, and more specifically to providing the services simultaneously via a data center and a cloud network.

2. Description of the Related Art

The use of computers and computer network based services has proliferated in many aspects of modern society. The most fascinating computer network is the Internet, which allows data such as messages, files, pictures videos, and the like, to be transmitted almost instantly anywhere in the world. The Internet has also spurred economic activity by allowing modern organizations to provide goods and services to previously unreachable customers. To support an Internet based business, an organization typically maintains one or more data centers. A data center is a centralized repository that may provide for storage, management, and dissemination of data associated with a particular organization. A data center may include one or more servers and other computer equipment which may support the activities of an organization. For example, the servers in a data center may include applications and databases that allow customers to purchase products and services via the Internet.

As the volume of business conducted over the Internet continues to grow at an exponential rate, modern organizations have to purchase more and more computer equipment to support the large volume of transactions, and to ensure the reliability of their network based services. However, maintaining and continuously expanding large data centers may prove to be expensive, and may also distract an organization's focus from its core business activities.

To avoid maintaining a data center, many modern organizations have turned to cloud computing. Cloud computing allows a user to use resources, primarily servers, owned by a third party provider, such that the user does not need to make substantial investment in computer hardware. Cloud computing provides dynamically scalable and often virtualized resources as a service over a network such as the Internet. Organizations using cloud computing can avoid capital expenditures by renting hardware, software, and services and paying a third party cloud computing service provider for only the resources that are used.

However, to reap the benefits of cloud computing, organizations with existing data centers will generally have to migrate data and services provided via the data center to the cloud before the existing data centers can be shut down.

SUMMARY OF THE INVENTION

The present invention relates to providing network based services, and more specifically to providing the services simultaneously via a data center and a cloud network.

One embodiment of the invention provides a method for simultaneously maintaining copies of data in a data center and a cloud computing environment. The method generally comprises transferring a modified first data record in a first database of the data center to a cloud replicator in the cloud computing environment, wherein the cloud replicator is configured to modify a corresponding data record in a second database of the cloud computing environment in response to receiving the modified first data record. The method further comprises determining whether a second data record has been modified in the second database, and upon determining that the second data record has been modified, determining whether a corresponding data record in the first database of the data center should be modified.

Another embodiment of the invention provides another method for simultaneously maintaining copies of data in a data center and a cloud computing environment. The method generally comprises receiving a modified first data record from a first database of the data center, and determining whether a second data in the second database should be modified based on the modified first data record. Upon determining that the second data record should be modified, the method further comprises replicating modifications to the first data record in the second data record, wherein the replicating comprises converting the modified first data record into a format compatible with the second database.

A further embodiment of the invention provides a computer readable storage medium comprising a program product which, when executed is configured to perform an operation for simultaneously maintaining copies of data in a data center and a cloud computing environment. The operation generally comprises transferring a modified first data record in a first database of the data center to a cloud replicator in the cloud computing environment, wherein the cloud replicator is configured to modify a corresponding data record in a second database of the cloud computing environment in response to receiving the modified first data record. The operation further comprises determining whether a second data record has been modified in the second database, and upon determining that the second data record has been modified, determining whether a corresponding data record in the first database of the data center should be modified.

Another embodiment of the invention provides a system comprising a memory device comprising at least one application for simultaneously maintaining copies of data in a data center and a cloud computing environment and at least one processor. The processor, when executing the at least one application, is configured to transfer a modified first data record in a first database of the data center to a cloud replicator in the cloud computing environment, wherein the cloud replicator is configured to modify a corresponding data record in a second database of the cloud computing environment in response to receiving the modified first data record. The processor is further configured to determine whether a second data record has been modified in the second database, and upon determining that the second data record has been modified, determine whether a corresponding data record in the first database of the data center should be modified.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
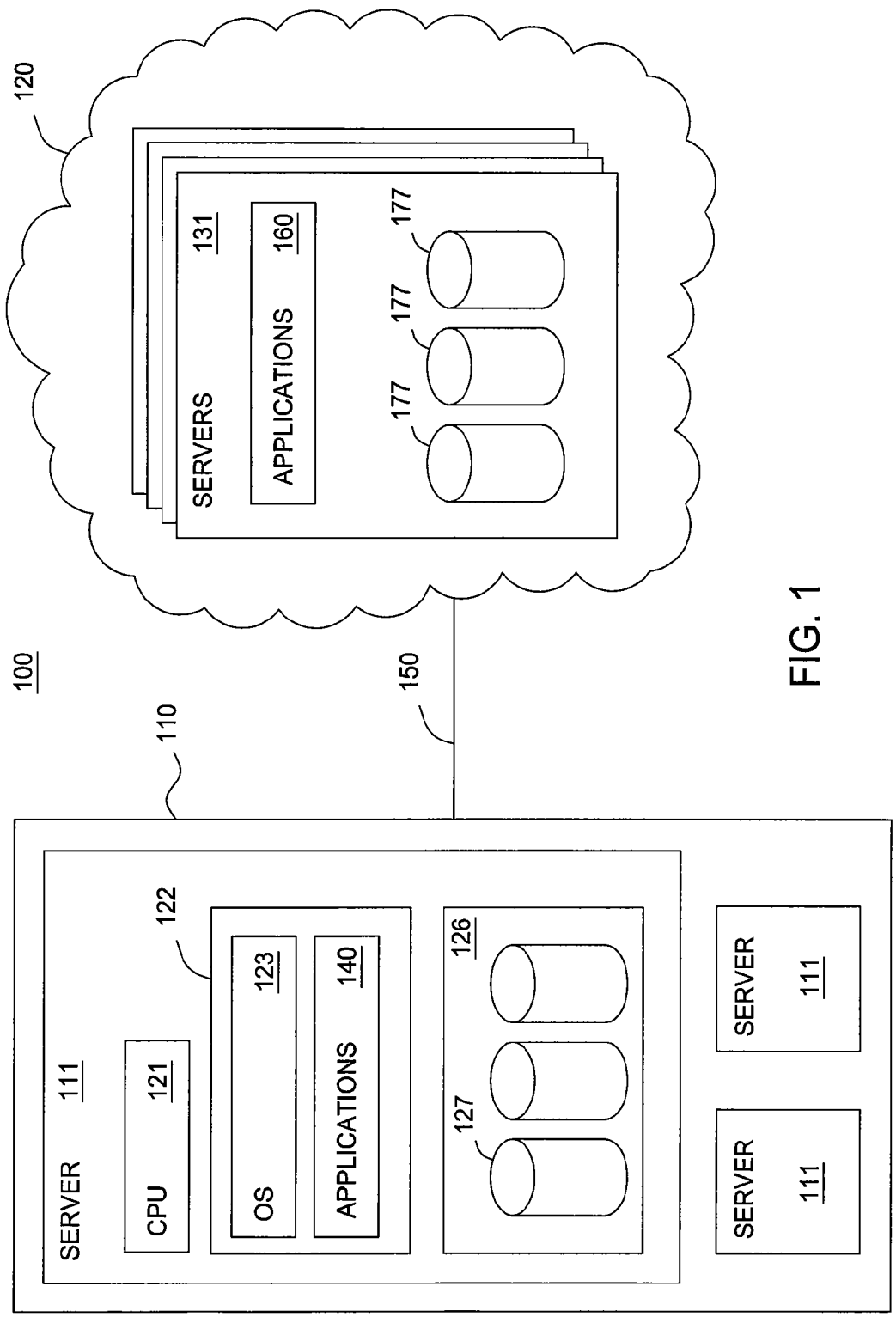
FIG. 1 illustrates an exemplary system according to an embodiment of the invention.

Embodiments of the invention provide methods, systems, and articles for simultaneously maintaining copies of data in a data center and a cloud computing environment providing network based services. Synchronizing applications monitor modifications to data records made in the data center and the cloud computing environment. The synchronizing applications are also configured to convert modified records from the data center into a format compatible with databases in the cloud computing environment prior to updating the databases in the cloud computing environment, and vice versa.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Many business organizations today have at least one data center to provide services via a network, such as the Internet. A data center is generally a collection of one or more servers that are configured to run applications that handle the applications and manage the operational data of an organization. As the volume of business conducted over computer networks continues to grow exponentially, the task of maintaining and expanding data centers has become very expensive and cumbersome for most organizations. As a result, many organizations have started renting Information Technology (IT) infrastructure resources from third parties, commonly referred to as cloud computing. Cloud computing allows organizations to avoid capital expenditures by renting hardware, software, and services from a third party, and pay the third party service provider for only the resources that are used.

Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud.

An organization that has existing data centers may have to migrate data and applications from the existing data centers to a "cloud" before the existing data centers can be shut down. Other organizations may choose to maintain existing data centers in addition to maintaining cloud based services. The term "cloud", as used herein, generally refers to the infrastructure facilities of a third party used to store, deploy, and run applications and data. During the migration period, both, the existing data centers and the cloud may be used to support the transactions of an organization. Accordingly, it is possible that the same data and applications may be present at the same time in the cloud and the data center. Because the same data may be present in the cloud and the data center, any changes made to the data in the data center may have to be replicated in the cloud, and vice versa.

Embodiments of the invention provide methods, articles, and systems that facilitate maintaining consistency of data between a data center and a cloud during a period when both, a data center and the cloud are operational, such as, during the period of migration referenced above. FIG. 1 illustrates an exemplary system 100, according to an embodiment of the invention. As illustrated in FIG. 1, the system 100 may include at least one data center 110 and a cloud 120 coupled to each other via a network 150. The network 150 may be any type of network including a wide area network (WAN), metropolitan area network (MAN), local area network (LAN), or the like. In a particular embodiment, the network 150 is the Internet.

In one embodiment, the data center 110 and the cloud 120 may be managed by different entities. For example, the data center 110 may be owned and managed by a private business organization. In other embodiments, the data center may be owned and managed by any individual or entity for providing network based services, whether related to a business or not. For the sake of simplicity, the owner of the data center 110 is simply referred to hereinafter as an "organization". While a single data center 110 is shown in FIG. 1, in alternative embodiments, a plurality of data centers may be owned and operated by the organization.

The cloud 120 may be owned and managed by a cloud computing service provider. Examples of cloud computing service providers include Amazon Web Services®, Microsoft Live Mesh®, GoogleApp Engine®, and the like.

As illustrated in FIG. 1, the data center 110 may include a plurality of servers 111 (three such servers 111 are shown in FIG. 1). Each of the servers 111 may be similarly arranged and may include a CPU 121, memory 122, and a storage device 126. Memory 122 may be a random access memory sufficiently large to hold the necessary programming and data that are located on a given server 111. Storage 126 is preferably a Direct Access Storage Device (DASD). Although it is shown as a single unit, it could be a combination of fixed and/or removable storage devices, such as fixed disc drives, floppy disc drives, tape drives, removable memory cards, or optical storage. In one embodiment, the memories 122 and storage devices 126 of servers 111 could be part of one virtual address space spanning multiple primary and secondary storage devices.

Each server 111 may generally be under the control of an operating system 123 shown residing in memory 122. Examples of the operating system 123 include IBM OS/400®, UNIX, Microsoft Windows®, Linux and the like. More generally, any operating system capable of supporting the functions described herein may be used.

The memory 122 may further include one or more service applications 140 and one or more synchronization applications 145. The applications 140 and 145 may be software products comprising a plurality of instructions that are resident at various times in various memory and storage devices in the system 100. When read and executed by a CPU 121 in the server 111, the applications 140 and 145 cause the system 100 to perform the steps necessary to execute steps or elements embodying the various aspects of the invention.

In one embodiment, the storage device 126 may include at least one database 127 (three such databases 127 are shown). The databases 127 are representative of any collection of data regardless of the particular physical representation. By way of illustration, the database 127 may be organized according to a relational schema, an XML schema, or the like. However, the invention is not limited to a particular schema and contemplates extension to schemas presently unknown. As used herein, the term "schema" generically refers to a particular arrangement of data. In a particular embodiment, the database 127 may be an Oracle Database® produced and marketed by Oracle Corporation.

In one embodiment of the invention, the service applications 140 may include applications that support one or more network based services provided by an organization. For example, the service applications 140 may be configured to facilitate transactions with customers to purchase and provide goods or services. While performing the transactions, the service applications may modify data that is stored in the databases 127.

For example, an organization may provide a "video on demand" service to customers over the network 150. Accordingly, one or more of the service applications 140 may be configured to stream one or more videos stored in a databases 127 to a user computer (not shown) via the network 150. The service applications 140 may also be configured to receive one or more service requests or commands from the user via the network 150. For example, a customer viewing a video may send a pause command, rewind command, play command, and the like. The service applications 140 may be configured to appropriately respond to the customer requests by pausing, rewinding, or playing a video in response to the foregoing commands.

In one embodiment, if a user partially views a video, the service applications 140 may be configured to save a stopping point in the partially viewed video so that the user may resume viewing the video from the stopping point at a later time. Customer data such as stopping points in partially viewed videos may also be stored in the databases 127.

While a video on demand service is referenced above as an example, embodiments of the invention are not limited to data centers and clouds implementing video on demand services. In general, embodiments of the invention may advantageously be utilized in any type of business or non-business activity requiring transactions over a computer network. The service applications 140 may be any applications to support the transactions, and the databases 127 may store any type of data to facilitate the transactions.

The synchronization applications 145 may be configured to perform operations for maintaining consistency between data in the data center 110 and the cloud 120, as will be discussed in greater detail below.

As illustrated in FIG. 1, the cloud 120 may include a plurality of servers 131. The servers 131 may include service applications 160, synchronization applications 165, and one or more databases 177. The service applications 160 may correspond to the service applications 140, and may perform similar or same functions as the service applications 140. For example, customers trying to access a network service of the organization may be directed to any one of the data center 110 and the cloud 120. Upon being directed to the cloud 120, the service applications 160 may facilitate transactions with the customer. However, if the customer is directed to the data center 110, the applications 140 may facilitate transactions with the customer.

Each of the servers 177 in the cloud may include one or more databases 177. The databases 177 may be configured to store the same data included in the databases 127 of the data centers 111. In some embodiments, the databases 177 may include several copies of the databases 127 of the data centers 111 to provide redundancy and a fail-safe in case one or more copies of the data is lost or corrupted.

In one embodiment of the invention, the databases 177 and the databases 127 may be different types of databases using different schema. For example, in a particular embodiment, the databases 127 may be a relational whereas the databases 177 may be a key-value store. A relational database may use common characteristics within a data set to organize data. For example, transactions between the organization and its customers can be organized based on a year in which the transactions occurred, the amount of the transactions, names of the customers, and the like.

Key/value stores are distributed, replicated, eventually consistent and highly available databases. Key-values stores are different from relational databases where the data storage may generally not be distributed, which may result in lower availability but provides stronger consistency. A traditional, clustered relational database requires a sizable upfront capital outlay, is complex to design, and often requires a database administrator to maintain and administer the database. On the other hand, key-value stores tend to be simpler, requiring no schema. Furthermore, data may automatically be indexed in key-value stores, and accessed via simple API.

In a particular embodiment, the databases 127 may be Oracle Databases®, while the databases 177 may be a type of SimpleDB® or Amazon Simple Storage Service (Amazon S3)_® produced and marketed by Amazon.com. While relational databases and key-value stores are referenced herein, in alternative embodiments, the databases 127 and 177 may each be one of any different types of databases, with or without schemas of any type.

As with the service applications 140 that modify the data in the databases 127, the service applications 160 in the cloud 120 may modify data in the databases 177 while providing network based services. Because a user may access data in any one of the data center 110 and the cloud 120, the data in the databases 127 and 177 may have to be synchronized to provide accurate service to users. For example, referring back to the video on demand example, a user's initial request to view a video may be directed to the data center 110. A service application 140 of the data center may stream the video to the user's computer via the network. If the user partially views the video, the service application 140 may store a stopping point for the video in a database 127. A subsequent request by the user to view the video may be directed to the cloud 120. Because the user may want to view the video from the stopping point, the databases 177 in the cloud must be updated to include the stopping point stored in the database 127.

Embodiments of the invention provide synchronization applications 145 and 165 which may be configured to ensure that modifications to data in the data center 110 are replicated in the cloud 120, and vice versa. The operations of the synchronization applications are described in greater detail below.

Figure 2:
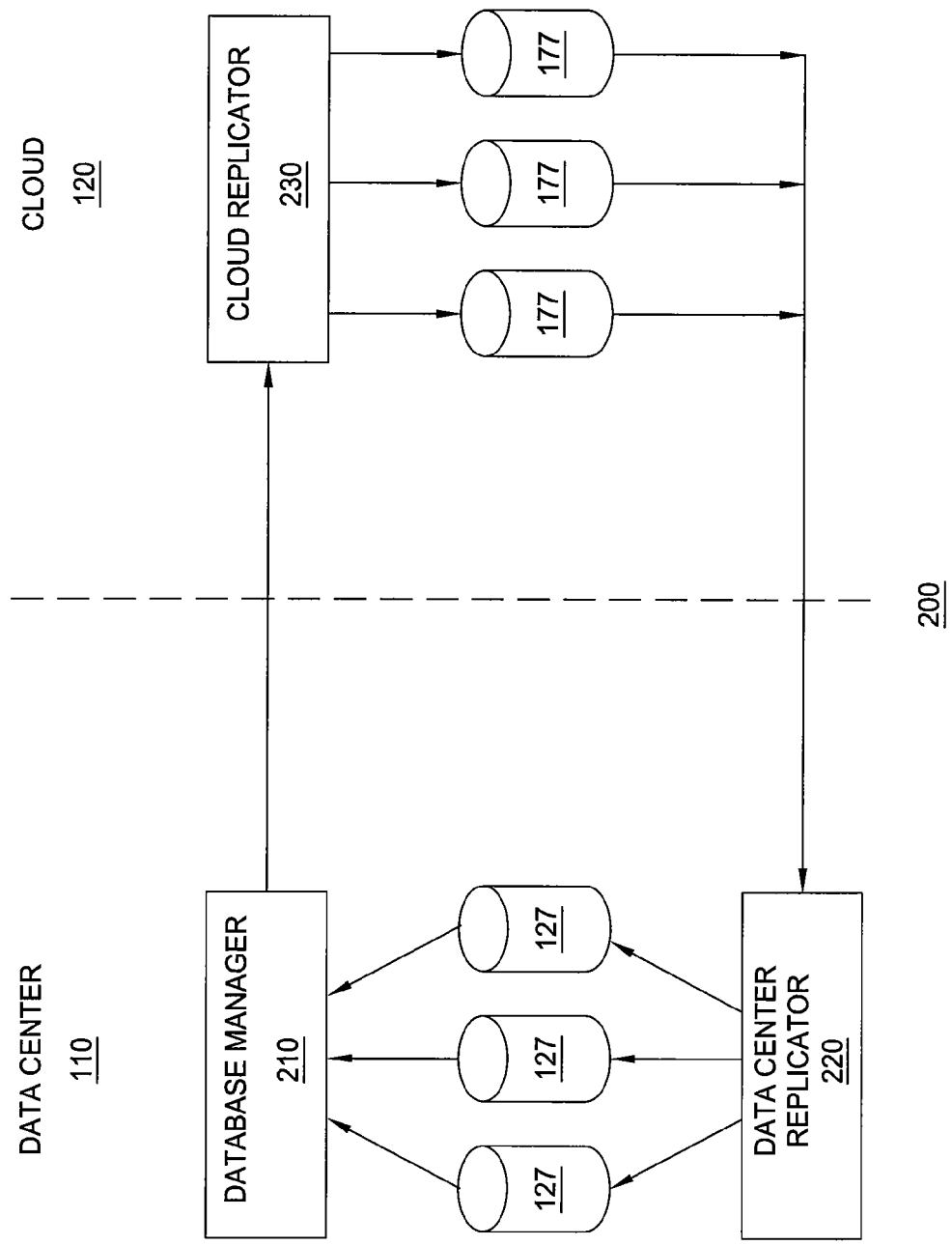
FIG. 2 illustrates a relational view between synchronizing applications according to an embodiment of the invention.

FIG. 2 illustrates a relational view of synchronization applications running in a data center 110 and a cloud 120. As illustrated in FIG. 2, the data center 110 may include a database manager application 210 and a data center replicator application 220 running therein. The database manager and the data center replicator may be examples of the synchronization applications 145 illustrated in FIG. 1.

The database manager 210 may be configured to detect changes made to the databases 127. Changes to the databases 127 may be made by applications 140 (see FIG. 1) during the course of providing a network based service, as described above. The database manager 210 detects changes to the databases 127 in several different ways. In one embodiment, the database manager 210 may be configured to detect accesses to the databases 127 by the applications 140. When an access to a database 127 is detected, the database manager may be configured to determine which records of the database 127 are accessed, and whether the database records have been modified.

In an alternative embodiment, the records in the databases 127 may include a modification field indicating whether a record has been modified. Applications 140 accessing the databases 127 may be configured to update the modification field for records that have been modified. In such embodiments, the database manager 210 may be configured to periodically scan the records in the databases 127 and identify records that have been modified based on the modification fields.

In one embodiment, modified records may be transferred by the database manager 210 to the cloud replicator 230 in the cloud 120 via network, e.g., the network 150 illustrated in FIG. 1. In one embodiment, the database manager 210 may be configured to monitor a message bus transferring data to and from the databases 127. Upon detecting that a database record has been modified, the database manager 210 may be configured to pull modified data records from the message bus and transfer the database record to the cloud 120. Alternatively, the database manager 210 may simply send a message to the cloud replicator 230 identifying a modified data record. In response, the cloud replicator 230 may access the databases 127 to retrieve the identified modified data records.

The cloud replicator 230 may be an example of a synchronization application 165 shown in FIG. 1. The cloud replicator 230 may be configured to receive modified data records from the database manager 210, and update corresponding records in the databases 177. Because the databases 127 and 177 may be different types of databases, in one embodiment, the cloud replicator 230 may be configured to convert the modified data records received from the database manager 210 into a format that is compatible with the databases 177 prior to completing the update.

In one embodiment of the invention, the cloud replicator 230 may be adapted to implement business logic and rules configured to ensure that the databases 177 are accurately updated. One example of business rule may be that the databases 177 can be updated with only the most recently modified data. In other words, in one embodiment, if a modified data record is received by the cloud replicator 230 from the database manager 210, the databases 177 may be updated only if the modified record is the most recently modified version of the data record.

The following example illustrates how the foregoing business rule may be implemented. Suppose a record X in database 127 is modified by an application 140 at the data center 110 at time t1. In one embodiment, the database manager 210 may identify that record X has been modified, and consequently send the modified data record X to the cloud replicator 230. In one embodiment of the invention, the database manager 210 may be configured to include a timestamp with the modified data record X indicating that the data record X was modified at time t1.

Now suppose an application 165 in the cloud 120 modifies a data record corresponding to the record X of data center 110 at a time t2, after time t1. In one embodiment, the cloud replicator may receive the modified data record X from the database manager 210 at time t3, after time t1 and t2. In other words, the modified data record X is received from the database manager 210 after the most recent update is made to the record X in the cloud. In one embodiment, the cloud replicator may be configured to compare the timestamp of the modified data record X received from the database manager 210 and a timestamp of a corresponding data record X stored in the databases 177 to determine whether the modified data record X received from the database manager is the most recently modified copy. In the above example, because the databases 177 have the most recently (at time t3) modified copy of data record X, the cloud replicator 230 may not update the databases 177 with the modified data record X received from the database manager 210.

Other business rules may define a priority amongst different types of data accesses occurring at the same time. For example, suppose a data record Y is modified at time t4 in a database 127 of the data center 110. At the same time t4, a corresponding data record Y may be deleted in a database 177 of the cloud 120. In one embodiment, a delete action may have a lower priority than other types of data accesses. Accordingly, the delete action may not result in the data record Y being deleted in the scenario above. For example, the database manager 210 may send the modified data record Y from the data center 110 to the cloud 120. The cloud replicator 230 may compare time stamps of the modified data record Y received from the data center and the time stamp of the deleted data record Y in the cloud. Because modification of the data record Y in the data center and deletion of the data record Y in the cloud occurred at the same time, the cloud replicator may restore the data record Y in the cloud with the modified data record Y received from the data center. For the same reason, the data center replicator 220 may be configured to preserve the data record Y in the data center 110 upon detecting that the data record Y is deleted in the cloud at time t4.

The data center replicator 220 may be configured to scan data records stored in the databases 177 to identify modified data records. Any reasonable means may be implemented for identifying modified data records. For example, in one embodiment, the data records 177 may include a modification field indicating whether a given record has been modified. In an alternative embodiment, the data center replicator 220 may be configured to compare time stamps indicating the time of last modification of records in the databases 177 with time stamps indicating the time of last modification of corresponding records in the databases 127 at the data center 110. Based on the comparisons, if the most recent copy of a data record is found in the databases 177, the data center replicator 220 may update a corresponding record in the databases 127.

In one embodiment of the invention, the data center replicator 220 and the cloud replicator 230 may be configured to determine whether data records in respective databases 127 and 177 should be updated based on a version number associated with the data records. Specifically, each data record may include a version number field which may be incremented or decremented after each update to the data record. The data center replicator 220 and the cloud replicator 230 may be configured to compare version numbers of corresponding data records in the data center 110 and the cloud 120, and update the data records in respective databases 127 and 177 based on the version numbers of the data records. For example, the cloud replicator 230 may determine that the version number of a data record Z in the cloud is lower than a corresponding data record Z in the data center. Accordingly, the cloud replicator may update the data record Z in the cloud with the corresponding data record Z received from the data center 110. If the version number of the data record Z in the cloud was greater than the version number of the data record Z received from the data center, then the cloud replicator may not update the data record Z in the cloud.

While not shown in FIG. 2, in one embodiment, the cloud 120 may include a database manager program that may functions similar to the database manager 210 at the data center. Specifically, the database manager in the cloud 120 may monitor changes to the databases 177, and transfer copies of modified data records to the data center replicator 220.

Because the databases 127 and 177 may be different types of databases, in one embodiment, the data center replicator 220 may be configured to convert the modified data records retrieved from the cloud 120 into a format that is compatible with the databases 127 prior to updating the databases 127. In one embodiment of the invention, the data center replicator 220 may also be adapted to implement business logic and rules such as the business logic and rules discussed above with reference to the cloud replicator 230.

While the database manager 210 and the data center replicator 220 are shown as applications running in a data center 110, in alternative embodiments, the database manager 210 and the data center replicator 220 may be applications that run in the cloud 120. In such embodiments, the database manager 210 and the data center replicator 220 may be configured to access the databases 127 via a network connecting the data center 110 to the cloud 120 (e.g., network 150) to perform the operations described hereinabove. In another embodiment, the cloud replicator 230 may be configured to run in the data center 110, and access the databases 177 via a network coupling the data center 110 and cloud 120.

Furthermore, while the database manager 210, cloud replicator 230, and data center replicator 220 are shown as separate applications, in some embodiments, one or more of the database manager 210, cloud replicator 230, and data center replicator 220 may be a part of the same combined application residing in one of the data center 110 and the cloud 120.

Embodiments of the invention may also be used to synchronize data between a data center and multiple distinct cloud environments. In such embodiments, the database monitor 210 may be configured to communicate with multiple cloud replicators 230 to synchronize data. Furthermore, the data center replicator 220 may be configured to monitor retrieve updates to databases from multiple cloud environments.

In addition to providing a mechanism for two-way replication of data between a data center and a cloud, embodiments of the invention may also provide a fail safe when one of the data center or the cloud becomes non-operational, for example, due to network outages, power failures, and the like. As an example, if a data center becomes non-operational due to a power failure, network services may still be available via the cloud. When the data center eventually becomes operational again, the data center replicator may automatically replicate any modifications to data in the cloud into data bases of the data center.

Embodiments of the invention may also be advantageously used to selectively replicate data from the cloud databases to the data center or vice versa. For example, if an organization desires to selectively replicate current data for a specific customer from a data center to the cloud, the data records of the customer may be updated in such as way that data records of the client are selectively replicated in the cloud. For example, an application 140 may selectively update time stamps of data records related to the client in the databases 127. Updating the timestamps of data records associated with the client may cause the cloud replicator to replicate the client's data records in the cloud via the methods described above. Similar methods may also be employed to selectively replicate data for an entire database from the cloud to the data center or vice versa.

Figure 3:
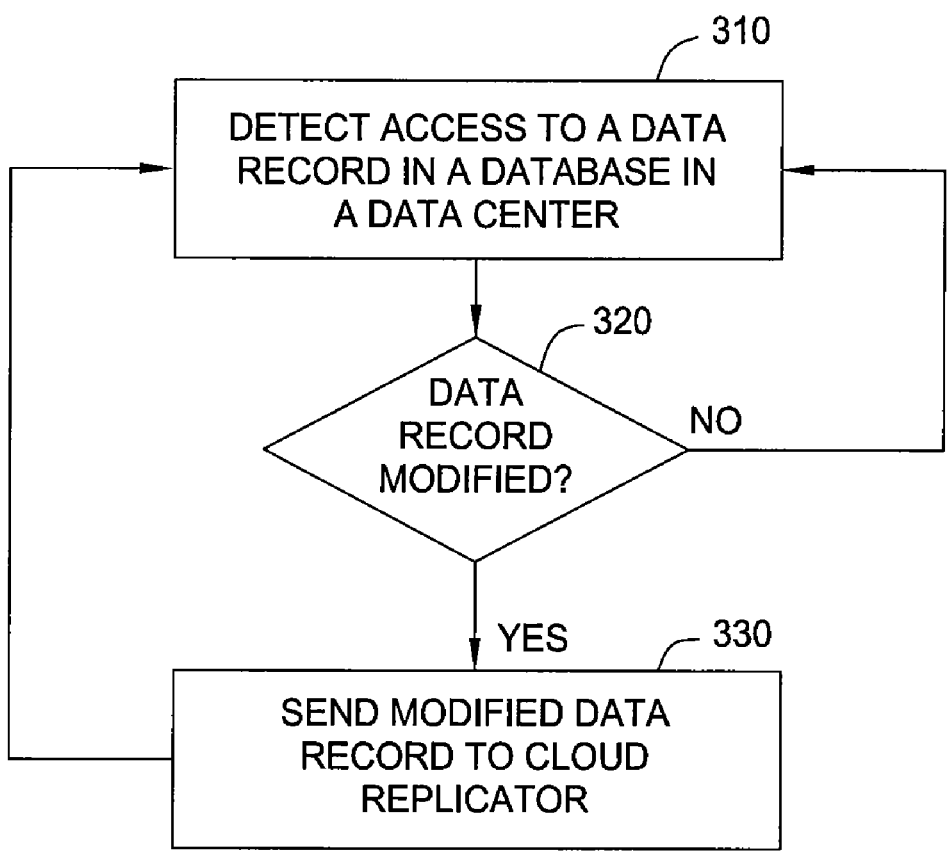
FIG. 3 is a flow diagram of exemplary operations performed by a database manager application, according to an embodiment of the invention.

FIG. 3 is a flow diagram of exemplary operations performed by the database manager 210, according to an embodiment of the invention. The operations may begin in step 310 be detecting an access to a data record in a database 127 in a data center 111. In step 320, the database manager 210 may determine whether the accessed data record has been modified. If the accessed data record has been modified, in step 330, the database manager 210 may transfer the modified data record to the cloud replicator 230. Thereafter, the operations may return to step 310. If the data record is not modified, the database manager 210 may return to step 310, as illustrated in FIG. 3. As discussed above, in one embodiment, the data monitor 210 may be configured to determine a time of modification of the data record and provide the time to the cloud replicator 230.

Figure 4:
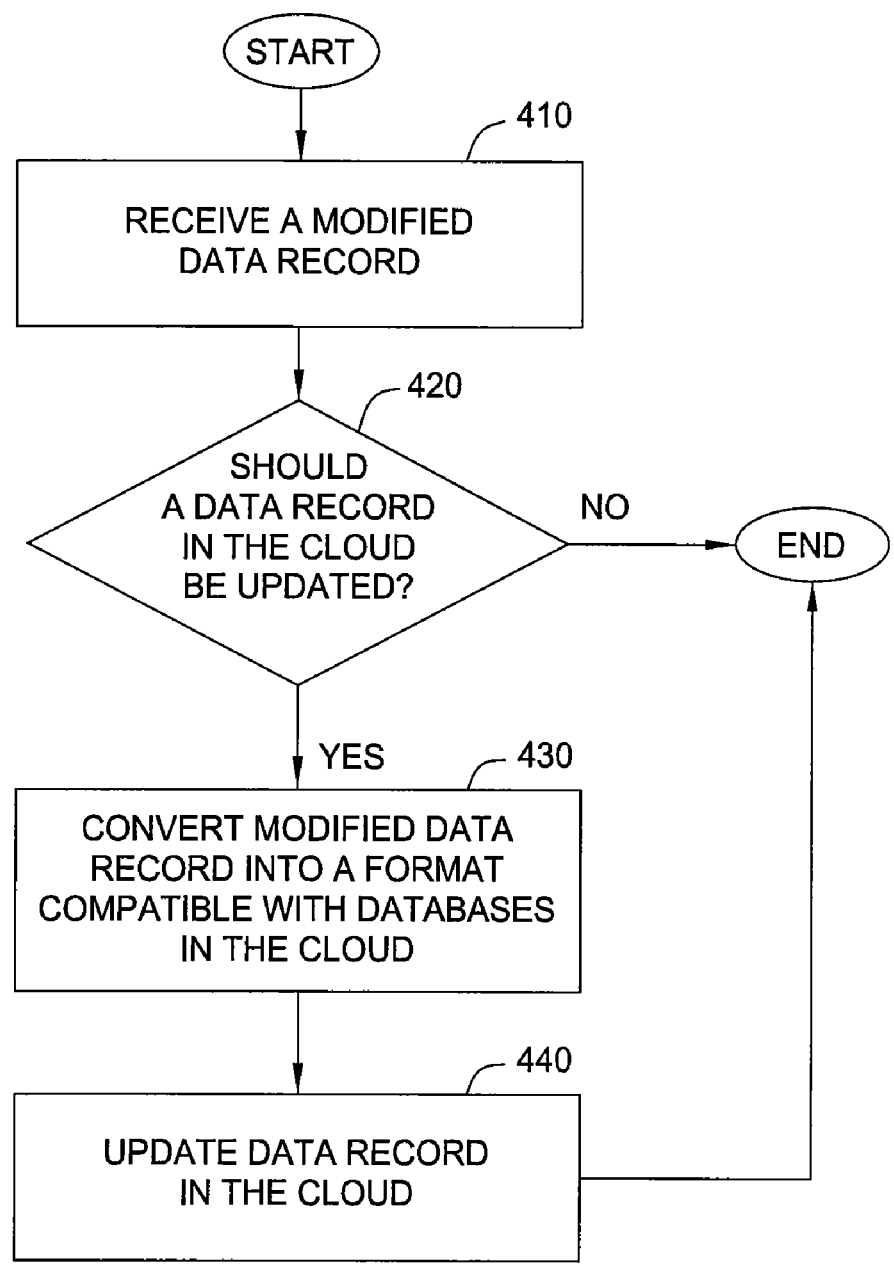
FIG. 4 is a flow diagram of exemplary operations performed by a cloud replicator application, according to an embodiment of the invention.

FIG. 4 is a flow diagram of exemplary operations that may be performed by the cloud replicator 230, according to an embodiment of the invention. As illustrated in FIG. 4, the operations may begin in step 410 by receiving a modified data record. In step 420, the cloud replicator may determine whether a data record in a cloud database should be updated based on one or more business rules. Examples of a business rule include updating data records in the cloud with only the most recent copy of the data record. If a data record in the cloud is to be updated, in step 430, the cloud replicator may convert the modified data record into a format compatible with databases in the cloud. Then, in step 440, the data record in the cloud may be updated. If it is determined in step 420 that the data record in the cloud should not be updated, the operation may end, as shown in FIG. 4.

Figure 5:
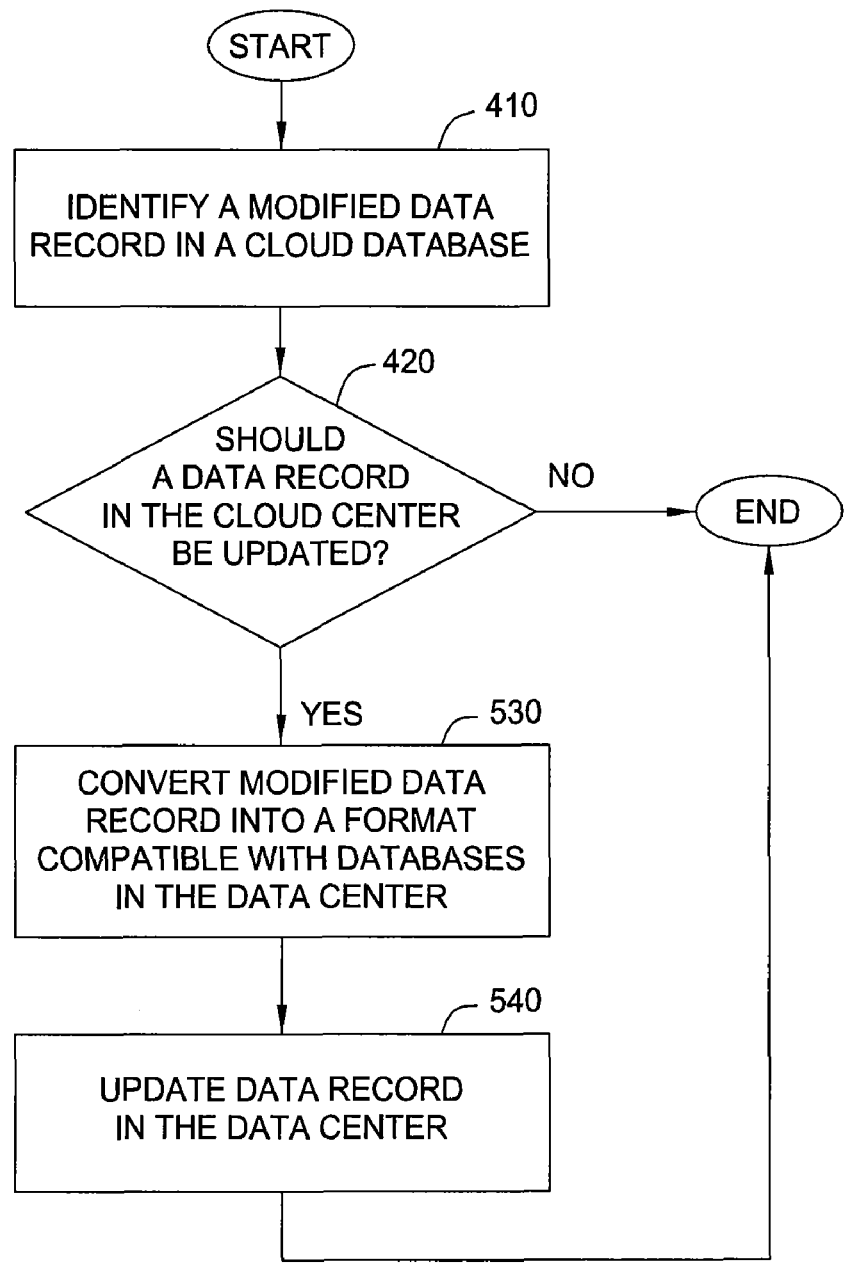
FIG. 5 is a flow diagram of exemplary operations performed by a data center replicator application, according to an embodiment of the invention.

FIG. 5 is a flow diagram of exemplary operations that may be performed by the data center replicator 220, according to an embodiment of the invention. As illustrated in FIG. 5, the operations may begin in step 510 by identifying a modified data record in a cloud database. In step 520, the data center replicator may determine whether a data record in a data center database should be updated based on one or more business rules. Examples of a business rule include updating data records in the cloud with only the most recent copy of the data record. If a data record in the data center is to be updated, in step 530, the data center replicator may convert the modified data record into a format compatible with databases in the data center. Then, in step 540, the data record in the data center may be updated. If it is determined in step 520 that the data record in the cloud should not be updated, the operation may end, as shown in FIG. 5.

By providing synchronizing applications configured to maintain consistency in data stored in a data center and a cloud, embodiments of the invention facilitate organizations that may provide services simultaneously via the data center and the cloud.

While the foregoing is directed to embodiments of the present invention, other and further embodiments of the invention may be devised without departing from the basic scope thereof, and the scope thereof is determined by the claims that follow.

What is claimed is:

1. A computer-implemented method for simultaneously maintaining copies of data in a data center and a cloud computing environment, comprising:

determining that a first data record in a first database of a data center has been modified;

transferring the first data record to a cloud replicator in the cloud computing environment, wherein the cloud replicator is configured to modify a corresponding data record in a second database of the cloud computing environment in response to receiving the first data record;

replicating, by the cloud replicator and based on at least one rule for updating data records, modifications to the first data record in the corresponding data record, wherein the replicating comprises converting the modified first data record into a format compatible with the second database;

determining whether a second data record has been modified in the second database; and upon determining that the second data record has been modified:

transferring, by the cloud replicator, the second data record to the first database; and replicating, based on at least one rule for updating data records, modifications to the second data record to a data record in the first database corresponding to the second data record, wherein the replicating comprises converting the second data record into a format compatible with the first database.

2. The computer-implemented method of claim 1, wherein the at least one rule comprises updating databases only with most recently modified data.

3. The computer-implemented method of claim 1, wherein the first database and the second database are different types of databases.

4. The computer-implemented method of claim 1, wherein determining that the first data record has been modified is based on the first data record being modified by a network service application.

5. The computer-implemented method of claim 1, wherein the data center and the cloud computing environment are configured to provide video on demand services to consumers; wherein a plurality of video files are stored in the databases of the data center and the cloud computing environment; wherein a data record associated with a video file indicates a stopping point of a user watching the video file; wherein a user receives a first portion of the video file from the data center, and receives a second portion from the cloud computing environment.

6. A method for simultaneously maintaining copies of data in a data center and a cloud computing environment, comprising:
  receiving a modified first data record from a first database of the data center, wherein the modified first data record marks a first time position of a video file, wherein the video file is stored in the first database, wherein a copy of the video file is stored in a second database of the cloud computing environment; and
  replicating modifications to the first data record in a second data record in the second database, wherein the second data record marks a second time position of the video file, wherein the replicating comprises converting the modified first data record into a format compatible with the second database and updating the second data record to mark the first time position,
  wherein the data center and the cloud computing environment are configured to provide video on demand services, wherein a plurality of databases in the data center and a plurality of databases in the cloud computing environment are configured to perform bi-directional modifications of data records based on the at least one rule for updating data records,
  wherein a user viewing a first portion of the video file from a first one of: (i) the first database, and (ii) the second database subsequently views a second portion of the video file from a second one of: (i) the first database, and (ii) the second database, different than the first, wherein the first portion of the video file concludes at the first time position, wherein the second portion of the video file begins at the first time position, wherein the first time position indicates a time in the video file where the user interrupted playback of the video file.

7. The method of claim 6, wherein the at least one rule for updating data records comprises updating databases only with most recently modified data.

8. The method of claim 6, wherein the at least one rule includes determining whether the first time position and the second time position are the same, wherein a plurality of video files are stored in the databases of the data center and the cloud computing environment.

9. A computer program product comprising:
  a computer-readable storage medium having computer-readable program code embodied therewith, the computer-readable program code comprising:
    computer-readable program code configured to determine that a first data record in a first database of a data center has been modified;
    computer-readable program code configured to transfer the first data record to a cloud replicator in the cloud computing environment, wherein the cloud replicator is configured to modify a corresponding data record in a second database of the cloud computing environment in response to receiving the first data record;
    computer-readable program code configured to replicate, by the cloud replicator and based on at least one rule for updating data records, modifications to the first data record in the corresponding data record, wherein the replication comprises converting the modified first data record into a format compatible with the second database;
    computer-readable program code configured to determine whether a second data record has been modified in the second database; and
    computer-readable program code configured to:
      transferring, by the cloud replicator, the second data record to the first database; and
      replicating, based on at least one rule for updating data records, modifications to the second data record to a data record in the first database corresponding to the second data record, wherein the replicating comprises converting the second data record into a format compatible with the first database.

10. The computer program product of claim 9, wherein the at least one rule for updating data records comprises updating databases only with most recently modified data.

11. The computer program product of claim 9, wherein the first database and the second database are different types of databases.

12. The computer program product of claim 9, further comprising transferring the modified first data record upon determining that the first data record has been modified by a network service application.

13. The computer-program product of claim 9, wherein the data center and the cloud computing environment are configured to provide video on demand services to consumers; wherein a plurality of video files are stored in the databases of the data center and the cloud computing environment; wherein a data record associated with a video file indicates a stopping point of a user watching the video file; wherein a user receives a first portion of the video file from the data center, and receives a second portion from the cloud computing environment.

14. A system, comprising:
  a memory device comprising at least one application for simultaneously maintaining copies of data in a data center and a cloud computing environment; and
  at least one processor which, when executing the at least one application is configured to:
    determine that a first data record in a first database of a data center has been modified;
    transfer the first data record to a cloud replicator in the cloud computing environment, wherein the cloud replicator is configured to modify a corresponding data record in a second database of the cloud computing environment in response to receiving the first data record;
    replicating, by the cloud replicator and based on at least one rule for updating data records, modifications to the first data record in the corresponding data record, wherein the replication comprises converting the modified first data record into a format compatible with the second database;
determine whether a second data record has been modified in the second database; and
upon determining that the second data record has been modified:
   transfer, by the cloud replicator, the second data record to the first database; and
   replicating, based on at least one rule for updating data records, modifications to the second data record to a data record in the first database corresponding to the second data record, wherein the replicating comprises converting the second data record into a format compatible with the first database.

15. The system of claim 14, wherein the first database and the second database are different types of databases.

16. The system of claim 15, wherein the cloud replicator is configured to:
   receiving the modified first data record from the first database of the data center; and
   replicating modifications to the first data record in a third data record in the second database, wherein the replicating comprises converting the modified first data record into a format compatible with the second database.

17. The system of claim 14, wherein the at least one rule for updating data records comprises updating databases only with most recently modified data.

18. The system of claim 14, wherein the data center and the cloud computing environment are configured to provide video on demand services to consumers; wherein a plurality of video files are stored in the databases of the data center and the cloud computing environment; wherein a data record associated with a video file indicates a stopping point of a user watching the video file; wherein a user receives a first portion of the video file from the data center, and receives a second portion from the cloud computing environment.

* * * * *